(12) United States Patent
Nieva Fatela et al.

(10) Patent No.: US 8,810,994 B2
(45) Date of Patent: Aug. 19, 2014

(54) POWER STORAGE MODULE FOR RAILWAY VEHICLES

(75) Inventors: Txomin Nieva Fatela, Irura (ES); Ion Onandia Jove, Irura (ES)

(73) Assignee: Caf Power & Automation, S.L.U., San Sebastian (Guipuzcoa) (ES)

( * ) Notice: Subject to any disclaimer, the term of this patent is extended or adjusted under 35 U.S.C. 154(b) by 88 days.

(21) Appl. No.: 13/808,212

(22) PCT Filed: Apr. 14, 2011

(86) PCT No.: PCT/ES2011/000119
§ 371 (c)(1),
(2), (4) Date: Jan. 3, 2013

(87) PCT Pub. No.: WO2012/004429
PCT Pub. Date: Dec. 1, 2012

(65) Prior Publication Data
US 2013/0107423 A1  May 2, 2013

(30) Foreign Application Priority Data
Jul. 7, 2010  (ES) .................................. 201000874

(51) Int. Cl.
| H01G 2/08 | (2006.01) |
| H01G 9/00 | (2006.01) |
| H01G 9/008 | (2006.01) |
| H05K 3/00 | (2006.01) |
| H01G 11/76 | (2013.01) |
| H01G 11/30 | (2013.01) |
| H01G 11/10 | (2013.01) |
| H01G 9/26 | (2006.01) |

(52) U.S. Cl.
CPC ................. *H01G 2/08* (2013.01); *H01G 11/76* (2013.01); *Y02T 10/7022* (2013.01); *H01G 11/30* (2013.01); *H01G 9/008* (2013.01); *Y02E 60/13* (2013.01); *H01G 11/10* (2013.01); *H01G 9/26* (2013.01)
USPC .......................................... 361/434; 361/690

(58) Field of Classification Search
CPC ....................................................... H01G 2/08
USPC .................................................. 361/434, 690
See application file for complete search history.

(56) References Cited

U.S. PATENT DOCUMENTS

| 5,872,711 A * | 2/1999 | Janko ............................. 363/144 |
| 6,714,391 B2 * | 3/2004 | Wilk et al. ...................... 361/15 |
| 7,764,496 B2 * | 7/2010 | Nguyen et al. ................ 361/697 |
| 2005/0041370 A1 | 2/2005 | Wilk et al. |
| 2007/0086146 A1 * | 4/2007 | Timmerman et al. ......... 361/434 |

FOREIGN PATENT DOCUMENTS

| FR | 2922378 A1 | 4/2009 |
| JP | 2009289943 A | 12/2009 |
| WO | 2006048431 A1 | 5/2006 |

* cited by examiner

Primary Examiner — Scott Bauer
(74) Attorney, Agent, or Firm — Lucas & Mercanti, LLP (57) ABSTRACT

Power storage module for railway vehicles, comprising multiple interconnected capacitors (1) with terminals (2) for establishing an electrical connection with a single connection plate (7) common to all the capacitors (1) and mechanical securing by means of a support plate (6) placed between the terminals (2) and the connection plane (7), the terminals (2) being oversized in such a way as to define a cooling channel between the support plate (6) and the capacitors (1), the connection plate (7) being insulated from said cooling channel by means of the support plate (6).

11 Claims, 7 Drawing Sheets

POWER STORAGE MODULE FOR RAILWAY VEHICLES

CROSS-REFERENCE TO RELATED APPLICATIONS

This application is a 371 of PCT/ES2011/000119 filed Apr. 14, 2011, which in turn claims the priority of ES P201000874 filed Jul. 7, 2010, the priority of both applications is hereby claimed and both applications are incorporated by reference herein.

FIELD OF THE ART

The present invention relates to devices for storing electric power by means of using high capacity capacitors, proposing a compact power storage module for supplying power to the drive equipment and auxiliary systems of railway vehicles such as tramways, subways, or trains.

STATE OF THE ART

In the search for a sustainable future, transport-related carbon emission reduction has resulted in the conversion of electric drive into one of the most efficient solutions for driving means of public transport, such as the case of tramways, trains, subways, buses, etc.

In the case of electric-powered city or inter-city transports such as tramways, power is usually supplied to the drive equipment by means of an articulated system of bars located on the roof or the tramway, drawing current by contacting an overhead line (catenary). These overhead lines are increasingly shunned in cities due to the visual impact that they generate on the environment, besides the high economic cost of infrastructure involved in using these lines.

Various solutions have been developed to eliminate the catenary, one of them comprising supplying poser to the tramway through a third rail located on the ground between the steering rails, which is segmented into small, independently powered portions, in such a way that only the portions through where the tramway runs have electric current. These systems can be made with a direct contact between the tramway and the third rail or without contact, wherein the electricity does not go through the tracks directly but rather goes through converted by means of a magnetic field.

Other solutions for eliminating the catenary are based on using flywheels, however, the extensive development of capacitors and batteries in recent times have made capacitor- and battery-based power accumulators one of the most significant solutions for driving electric vehicles.

The accumulators comprise several power storage modules interconnected to one another for powering the drive equipment and auxiliary systems of the tramway; these modules are usually placed on the roof of the tramway and are partially charged by means of the kinetic energy recovered from braking, such that it is not necessary to establish a continuous connection with the catenary.

Conventional power storage modules are formed by multiple high capacity capacitors which are known as supercapacitors, double layer capacitors, or ultracapacitors, which can be supported by a set of batteries. In conventional modules, capacitors are linked with power electronics and control electronics which are in direct contact, i.e., the terminals of each capacitor of the module are directly connected with a connection plate placed immediately contiguous thereto in the upper part. This placement is counterproductive since the terminals of the capacitors reach high temperatures, which can affect the performance of the control electronics.

In this case, a forced air flow passes through the space defined between the upper part of the capacitor and the connection plate to cool the terminals, but the cooling surface established is very small due to the small size of the terminal of the capacitor, and the performance of the control electronics can also be affected by the moisture that the air may have, since the terminals to be cooled are in direct contact with the connection plate.

There are solutions for power storage modules wherein the power electronics and the control electronics are separated from one another, in these cases, on one side of the module and away from it, there is placed a connection plate, to which a multiplicity of cables from the terminals of the capacitors are led; in this case, the problem associated with temperature in the connection plate is solved, but the problem associated with temperature in the wiring between the latter and the terminals persists. This solution involves an assembly and installation problem, possible failures in the wiring connection, as well as a module size increase associated with space problems, which is contradictory to the current needs because the module must occupy little space and be as lightweight and as compact as possible since it is assembled in the tramway itself.

It is therefore necessary to have a power storage module for use in railway applications which is compact and lightweight, wherein the power electronics (the terminals of the capacitors) and the control electronics (the connection plate) are separated from one another to prevent possible temperature- or air moisture-associated failures, and which has neither intermediate cables nor connectors to enable space optimization.

OBJECT OF THE INVENTION

The present invention proposes a power storage module for supplying power to the drive equipment and auxiliary systems of railway vehicles, having a lightweight and compact structure, and wherein the control electronics is insulated from the power electronics.

The power storage module for railway vehicles object of the invention comprises a plurality of interconnected capacitors interconnected in series, wherein each capacitor of the module has a pair of terminals establishing an electrical connection with a single connection plate common to all the capacitors, and they likewise establish mechanical securing with a support plate placed between the terminals and the connection plate. The terminals of the capacitors are oversized in such a way as to define a cooling channel between the support plate and the capacitors, the connection plate being insulated from said cooling channel by means of the support plate.

Problems relating to the conventional solutions are successfully solved with this structural configuration because, since the connection plate is insulated from the terminals of the capacitors, problems associated with temperature or with the possible moisture of the cooling air do not arise and, likewise, since the terminals are oversized in length, the section of the cooling channel is increased and the cooling conditions of the terminals are improved. On the other hand, by placing a single connection plate directly connected with the terminals of the capacitors, all wiring and thus wiring-associated problems are eliminated.

According to a preferred embodiment of the invention, the oversizing of the terminals is determined by means of a longitudinal elongation of the actual terminals of the capacitors.

According to another embodiment of the invention, the oversizing of the terminals is determined by means of an additional part which is associated with each terminal of the capacitors.

The cooling channel of the power storage module of the invention has a section of more than 1.5 centimeters through where a forced air circulation occurs, and wherein this section has a size considerably similar to the size of the oversized terminals, whereby improving the cooling conditions of the terminals of the capacitors.

The possibility that the cooling of the terminals is performed by means of a fluid, the coolant circulating through the cooling channel without directly contacting the terminals of the capacitors, has been envisaged.

A perforated sheet made of insulating material which performs electrical insulating functions between the adjacent capacitors is placed on the assembly of the capacitors and at the height of the base of the terminals. On the other hand, this perforated sheet and the support plate have a support on their lateral sides with plates providing greater stiffness to the entire structural assembly, while at the same time acting as a lateral closure for the cooling channel, which improves the dissipation of heat generated in the terminals of the capacitors when the cooling is performed by forced air circulation.

The assembly formed by the support plate, the perforated sheet and the stiffening plates results in a lightweight and self-supporting structure, since it is manufactured from composite resins known as composite material, and further assures a suitable electrical insulation of the module with respect to other neighboring electrical equipment or modules.

All the capacitors of one and the same module are connected in series, a single electrical input and a single electrical output being determined for the entire module and wherein the capacitors of one and the same row are connected in a straight line, whereas each row of capacitors is connected with the next row by means of a connection in zigzag.

The voltage difference between adjacent capacitors is minimized with this electrical interconnection of the capacitors. Likewise, this configuration facilitates the scalability of the entire system and allows increasing the electric power accumulation capacity quickly and simply, wherein to achieve this, it is only necessary to connect, the output of one module with the input of the next module.

A power storage module is thus obtained which module, due to its constructive and functional features, is very advantageous, acquiring its own identity and preferred character for its intended application function in relation to supplying electric power for railway vehicles, although this application is not limiting, being able to be applied in transport vehicles of another type, such as the case of hybrid buses, as well as applications of another type.

DETAILED DESCRIPTION OF THE INVENTION

Figure 1A:
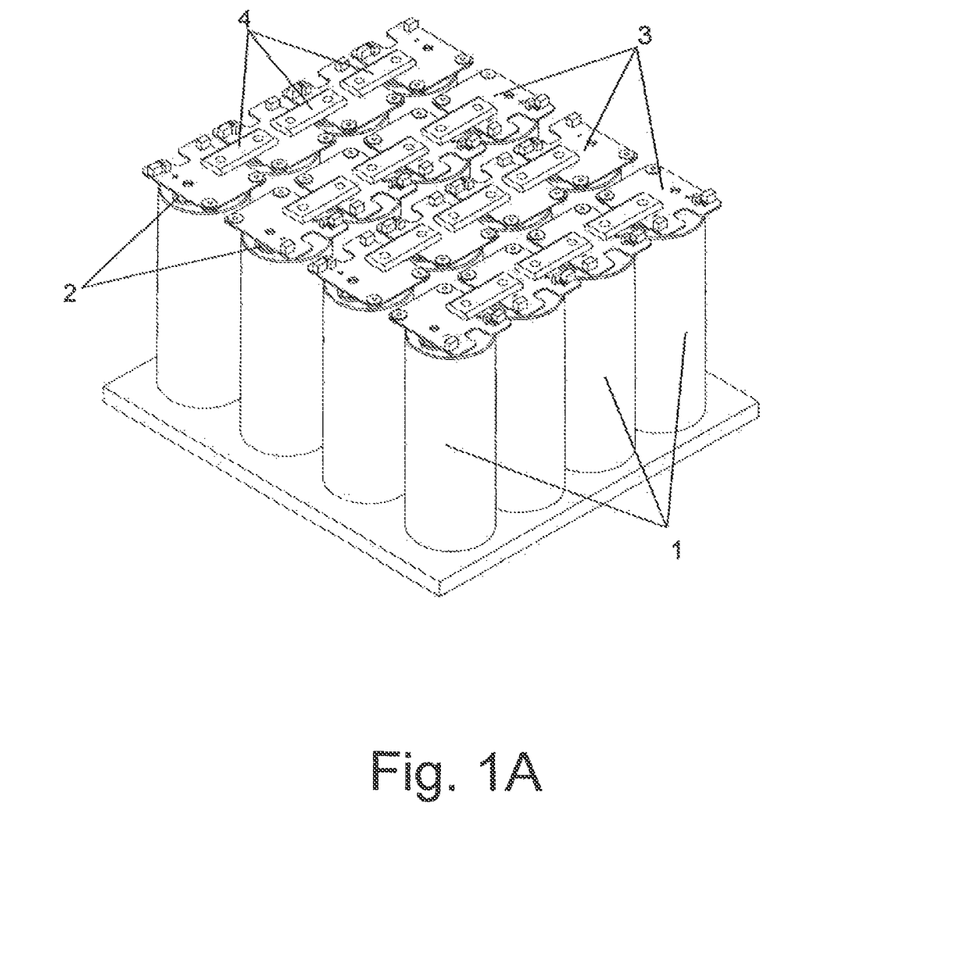
FIG. 1A shows a perspective view of a conventional power storage module wherein the terminals of the capacitors are in direct contact with the connection plates.

FIG. 1A shows a conventional power storage module which is formed by multiple interconnected capacitors (1). Each capacitor (1) of the module has two terminals (2), one for the positive terminal and another for the negative terminal. Connection plates (3) to where the electrical signals of the module arrive are located above the terminals (2) and are directly connected to them, each capacitor (1) having a connection plate (3).

The capacitors (1) of one and the same row are interconnected in series by means of bus bars (4) connecting the positive terminal (2) of a capacitor (1) with the negative terminal (2) of the next capacitor (1), or vice versa. The electric power accumulation capacity of this module is increased by connecting another power storage module to the output of each row of capacitors (1).

With this conventional assembly placement, the power electronics of the module, i.e., the terminals (2) of the capacitors (1), is directly connected with the control electronics of the module, i.e., the connection plate (3); this causes the high temperature reached by the terminals (2) to affect the electrical connections and signals extracted from the connection plates (3), since high currents circulate through the terminals (2) where a large amount of heat (of the order of hundreds of Amperes) is dissipated.

Figure 1B:
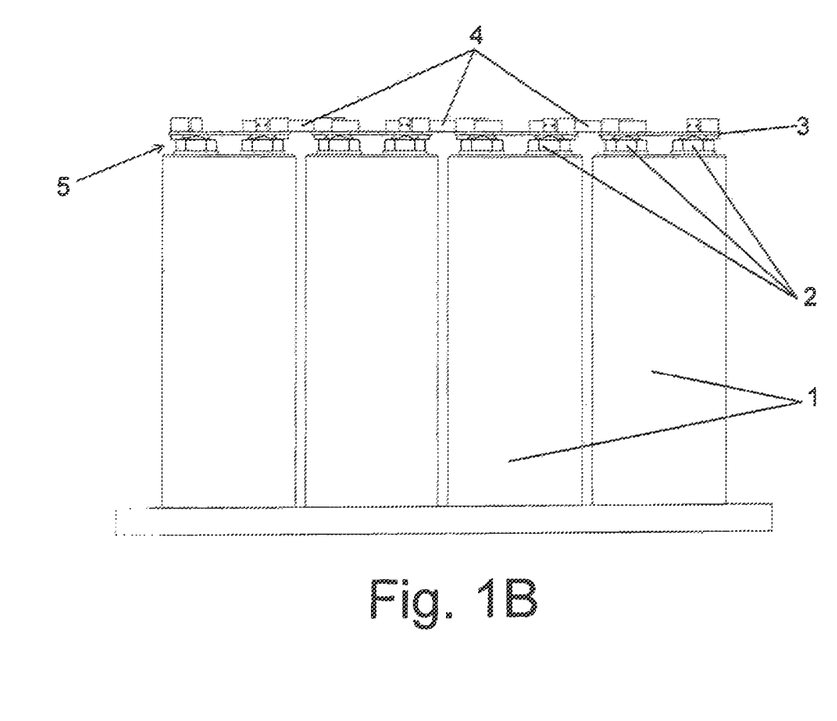
FIG. 1B shows an elevational view with respect to the preceding figure, in which the minimum section of the cooling channel is seen.

The terminals (2) of the capacitors (1) are cooled by means of forced air circulation through a cooling channel (5) defined between the connection plates (3) and the upper surface of the capacitors (1); this cooling channel (5) has a cross-section coinciding with the height of the terminals (2) (considerably less than that of the terminals proposed by the invention, of the order of less than 1.5 centimeters), which may be insufficient for a correct cooling of the terminals (2), in addition to having the problem of the control electronics directly contacting the forced air (see FIG. 1B).

The power storage module for railway vehicles object of the invention solves the aforementioned problems by separating the control electronics from the power electronics and by defining a cooling channel having a sufficient section to perform a correct cooling of the terminals (2) of the capacitors (1).

Figure 2A:
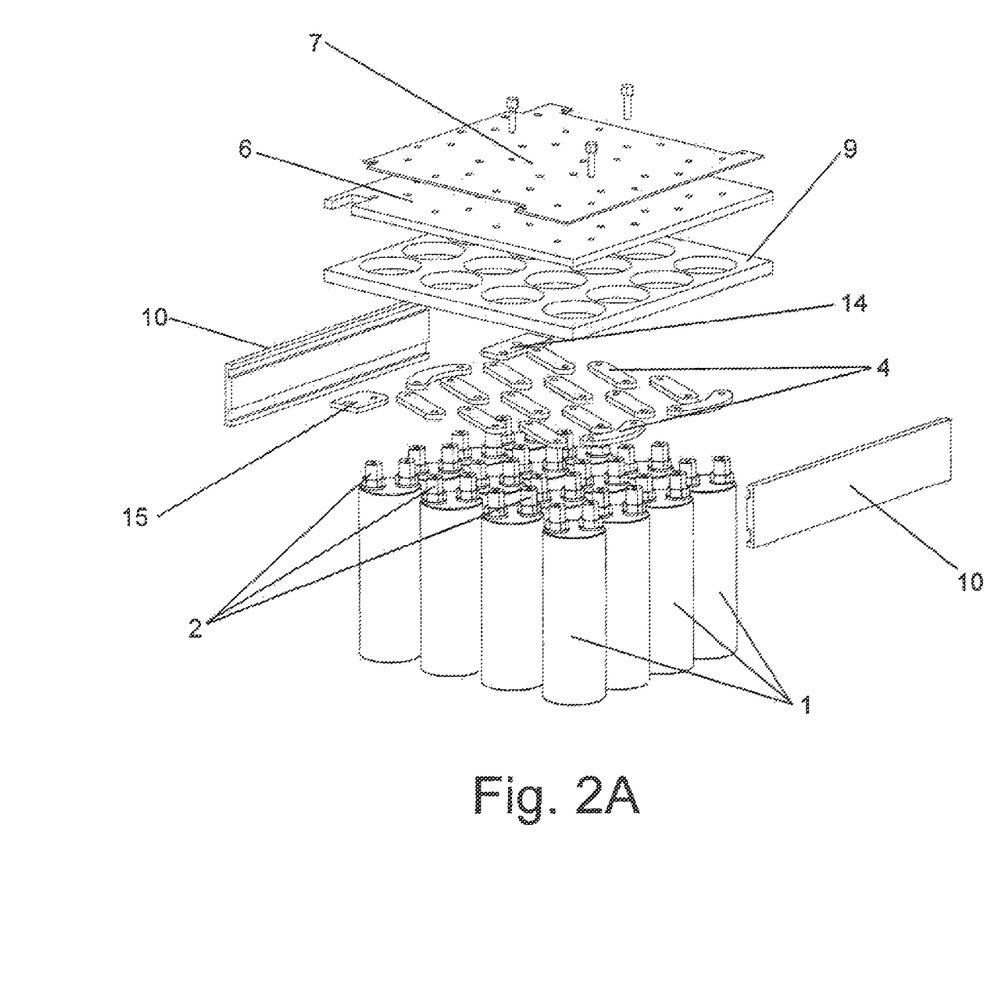
FIG. 2A is an exploded perspective view of a power storage module according to the object of the invention, wherein the terminals of the capacitors and the connection plate are separated by a support plate placed therebetween.

FIG. 2A shows an exploded perspective view of the power storage module object of the invention, which comprises multiple high capacity capacitors (1) each having oversized terminals (2), which are the positive and negative terminals of the capacitors (1). The oversized terminals (2) are connected to one another by means of bus bars (4), a support plate (6) made of a lightweight material and with, electrical insulation properties, acting as a support for a single connection plate (7) common to all the capacitors (1), being located above such bus bars (4).

Therefore, the oversized terminals (2) perform two functions, on one hand, they act as a mechanical securing with the support plate (6) stiffening the entire module, and on the other hand, they act as an electrical connection with the connection plate (7), such that the terminals (2) forming the power electronics of the module by means of the support plate (6) are insulated from the connection plate (7) forming the control electronics of the module by means of the support plate (6).

Figure 2B:
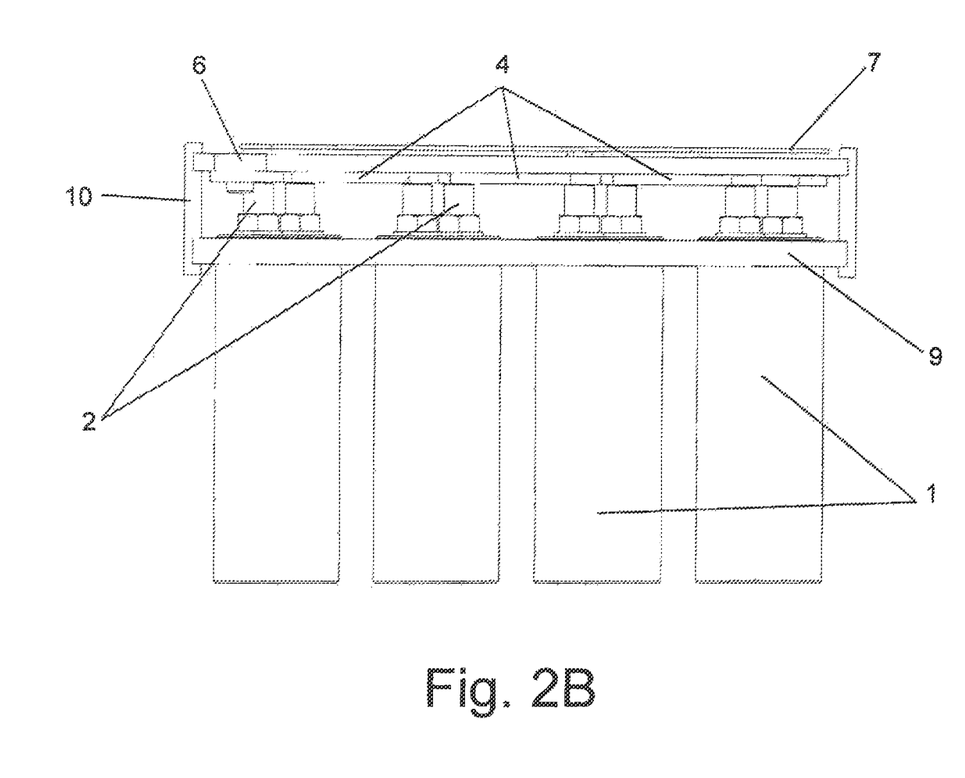
FIG. 2B shows an elevational view with respect to the preceding figure, wherein a cooling channel having a larger section than the conventional channel is defined.

As seen in FIG. 2B, the oversizing of the terminals (2) allows defining a cooling channel (8) with a sufficient section so as to efficiently dissipate the heat generated in the terminals (2). It has been envisaged that a section suitable for the cooling channel (8) is more than 1.5 centimeters in height, coinciding approximately with the size of the oversized terminals (2).

The cooling channel (8) providing direct access to the terminals (2) is insulated from the connection plate (7), this channel (8) being able to be valid both for cooling by forced air and for cooling by means of a fluid, wherein the coolant circulates through the cooling channel (8) without directly contacting the terminals (2) of the capacitors (1).

FIGS. 2A and 2B show a that perforated sheet (3) is placed at the upper end of the capacitors (1), at the height of the base of the terminals (2), which perforated sheet (9) is made of a resistant plastic material or the like, performing the functions of electrical insulation between the adjacent capacitors (1) and providing structural cohesion to the capacitor (1) assembly.

To provide greater stiffness to the entire assembly, it has been envisaged that the support plate (6) and the perforated sheet (9) rest on their lateral sides on stiffening plates (10), such that they confer greater stiffness to the module on one hand and act as a closure for the lateral sides of the channel (8) on the other, improving the cooling when the latter is by means of forced air circulation.

Figure 3:
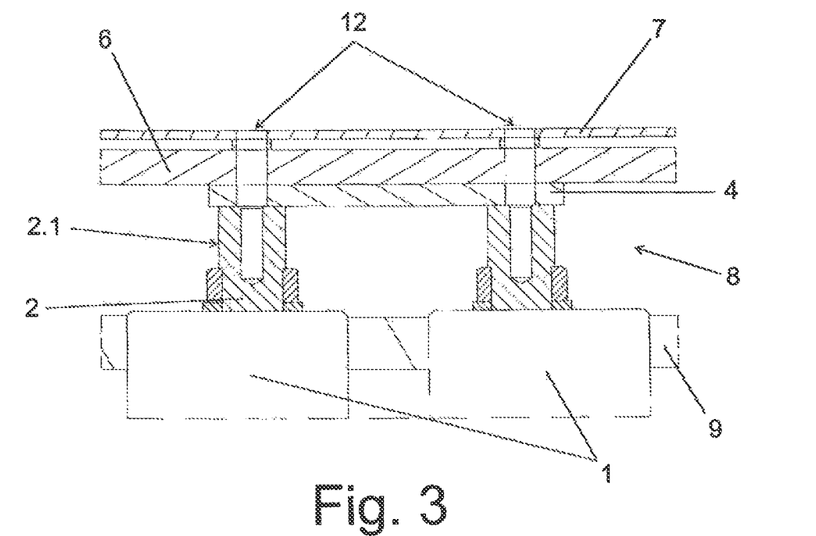
FIG. 3 shows a cross-section view of an embodiment of the oversizing of the terminals of the power storage module according to the invention.

FIG. 3 shows a preferred embodiment of the invention, wherein the oversizing of the terminals (2) is performed by means of a longitudinal elongation (2.1) of the actual terminals (2) of the capacitors (1). It is seen in this embodiment that, coinciding with each terminal (2), there is defined, a hole (12) traversing the connection plate (7), the support plate (6), the bus bar (4) and penetrating the terminal (2), such that by means of inserting a conductive fastening element, such as a screw, for example, in said hole (12), the mechanical securing and the electrical connection are established.

Figure 4:
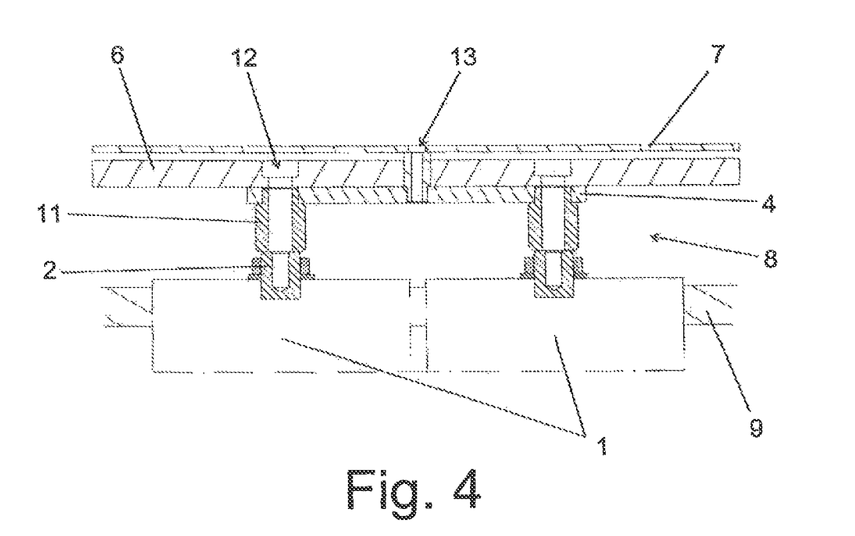
FIG. 4 shows a cross-section view of another embodiment of the oversizing of the terminals of the power storage module.

In one embodiment depicted in FIG. 4, it can be seen how the terminals (2) are oversized by means of an additional part (11) which is associated with a conventional terminal (2). In this case the hole (12) traverses the support plate (6), the bus bar (4) and penetrates the terminal (2), the mechanical securing being established by means of inserting a fastening element, whereas the electrical connection with the terminals (2) is performed, for example, by means of a screw which is inserted in a hole (13) traversing the connection plate (7), the support, plate (6), and the bus bar (4).

Figure 5:
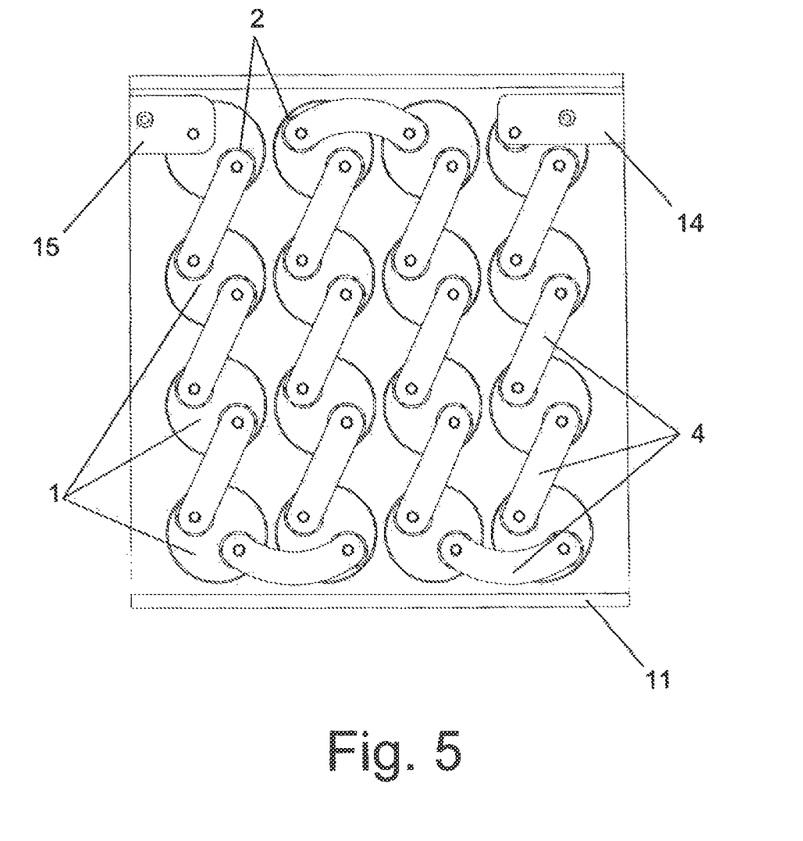
FIG. 5 shows the electrical interconnection established between the capacitors of the power storage module.

FIG. 5 shows the electrical interconnection of the power storage module, wherein ail the capacitors (1) of the module are connected in series by means of bus bars (4) connecting the positive terminal (2) of each capacitor (1) with the negative terminal (2) of the next capacitor (1), such that the capacitors (1) of one and the same row are connected in a straight line, and one row of capacitors (1) is connected with the next row in zigzag.

This configuration allows having a single electrical input (14) and a single electrical output (15) for the entire module; likewise, this electrical interconnection of the capacitors (1) minimizes the voltage difference between adjacent capacitors (1). According to this concept and since there are 16 capacitors (1) placed in rows of 4 in FIG. 5, the maximum voltage difference between two adjacent capacitors (1) of one and the same module of 16 capacitors (1) will be 8 times the voltage between the terminals (2) of one capacitor (1), i.e., the voltage difference between adjacent capacitors (1) located at the end of each row. This allows assuring minimum insulation distances which contribute to producing a very compact storage module. This configuration of 16 capacitors is not limiting, the power storage module being able to have an alternative configuration in the number of capacitors (1) and rows.

The structure formed by the support plate (6), the perforated sheet (9) and the stiffening plates (10) is a lightweight and self-supporting structure manufactured from composite resins, which further assures a suitable electrical insulation of the module with respect to other neighboring electrical equipment or modules.

Figure 6:
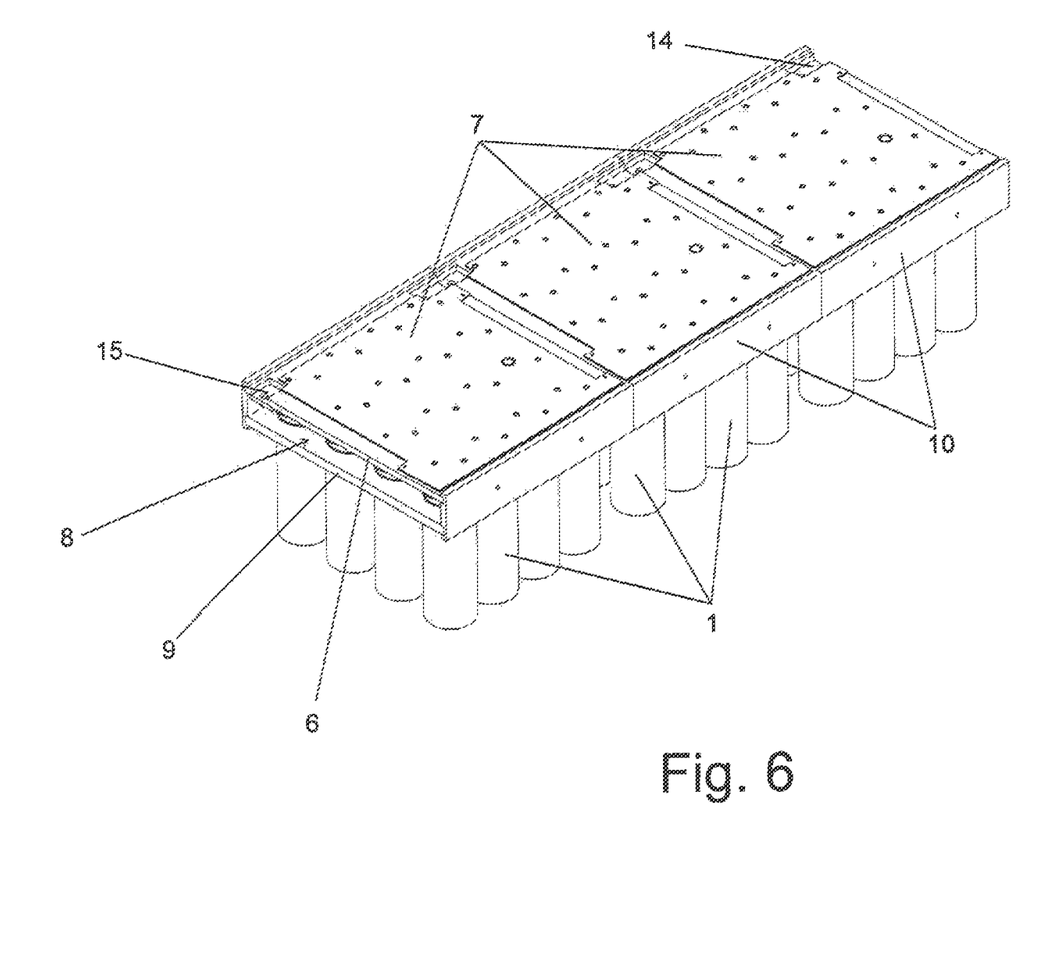
FIG. 6 shows the electrical interconnection of several power storage modules.

FIG. 6 shows the electrical interconnection of several power storage modules according to the invention, wherein connecting the output (15) of one module with the input (14) of the next module is sufficient to increase the electric power accumulation capacity of the module, facilitating the scalability of the entire system.

The capacitors (1) have been depicted in the drawings with a circular configuration, even though they may be supercapacitors, double layer capacitors, or ultracapacitors, of any known geometric configuration and type.

The invention claimed is:

1. A power storage module for railway vehicles, comprising multiple interconnected capacitors interconnected by means of bus bars, each capacitor has terminals which are connected to a single connection plate common to all the capacitors to where the electrical signals of the module arrive, and mechanical securing with a support plate placed between the terminals and the connection plate is established by means of the terminals of the capacitors; and the terminals are oversized in such a way as to define a cooling channel between the support plate and the capacitors, the connection plate being insulated from said cooling channel by means of the support plate.

2. The power storage module for railway vehicles according to claim 1, wherein the oversizing of the terminals is determined by means of a longitudinal elongation of the actual terminals of the capacitors.

3. The power storage module for railway vehicles according to claim 1, wherein the oversizing of the terminals is determined by means of additional parts which are associated with the respective terminals.

4. The power storage module for railway vehicles according to claim 1, wherein the cooling channel has a section of more than 1.5 centimeters, through where a forced air circulation occurs, and wherein said section has considerably the same size as the oversized terminals.

5. The power storage module for railway vehicles according to claim 1, wherein the cooling channel is provided with cooling by means of a coolant.

6. The power storage module for railway vehicles according to claim 1, wherein at the height of the base of the terminals and on the capacitors there is placed a perforated sheet made of insulating material performing the functions of electrical insulation between the adjacent capacitors and providing structural cohesion to the capacitor assembly.

7. The power storage module for railway vehicles according to claim 6, wherein the support plate and the perforated sheet rest on their lateral sides on plates providing stiffness to the assembly and acting as a lateral closure of the cooling channel.

8. The power storage module for railway vehicles according to claim 1, wherein the mechanical securing and the electrical connection are determined by means of a fastening element which is inserted in a hole traversing the connection plate, the support plate, the bus bar and which penetrates the respective terminal.

9. The power storage module for railway vehicles according to claim 1, wherein the mechanical securing is determined by means of a fastening element which is inserted in a hole traversing the support plate, the bus bar and which penetrates the respective terminal, whereas the electrical connection is determined by means of an element which is inserted in a hole traversing the connection plate, the support plate, and the bus bar.

10. The power storage module for railway vehicles according to claim 1, wherein all the capacitors of one and the same module are connected in series, a single electrical input and a single electrical output being determined for the entire module.

11. The power storage module for railway vehicles according to claim 10, wherein the capacitors of one and the same row are connected in a straight line, whereas each row of capacitors is connected with the next row in zigzag.

* * * * *